United States Patent
Chen (10) Patent No.: US 12,249,039 B2
(45) Date of Patent: Mar. 11, 2025

(54) METHOD AND SYSTEM FOR THREE-DIMENSIONAL RECONSTRUCTION OF TARGET OBJECT

(71) Applicant: SI CHUAN ZHONG SHENG MATRIX TECHNOLOGY DEVELOPMENT CO., LTD., Sichuan (CN)

(72) Inventor: Zhengquan Chen, Sichuan (CN)

(73) Assignee: SI CHUAN ZHONG SHENG MATRIX TECHNOLOGY DEVELOPMENT CO., LTD., Chengdu (CN)

( * ) Notice: Subject to any disclaimer, the term of this patent is extended or adjusted under 35 U.S.C. 154(b) by 220 days.

(21) Appl. No.: 18/149,680

(22) Filed: Jan. 4, 2023

(65) Prior Publication Data
US 2023/0386160 A1 Nov. 30, 2023

(30) Foreign Application Priority Data
May 24, 2022 (CN) .......................... 202210566798.0

(51) Int. Cl.
G06T 19/20 (2011.01)
G06T 7/11 (2017.01)
G06T 7/60 (2017.01)

(52) U.S. Cl.
CPC ............... *G06T 19/20* (2013.01); *G06T 7/11* (2017.01); *G06T 7/60* (2013.01); *G06T 2207/20221* (2013.01)

(58) Field of Classification Search
CPC ... G06T 19/20; G06T 7/11; G06T 7/12; G06T 7/13; G06T 17/00; G06T 7/60;
(Continued)

(56) References Cited

U.S. PATENT DOCUMENTS

| 2002/0048401 A1* | 4/2002 | Boykov | ............... G06T 7/11 382/173 |
| 2009/0141940 A1* | 6/2009 | Zhao | ............... G06T 7/248 382/103 |

(Continued)

FOREIGN PATENT DOCUMENTS

| CN | 103047969 A | 4/2013 |
| CN | 113269864 A | 8/2021 |

OTHER PUBLICATIONS

European Search Report of Counterpart European Patent Application No. 23151516.4 issued on Oct. 24, 2023.

*Primary Examiner* — King Y Poon
*Assistant Examiner* — Nayana Yeshlur (57) ABSTRACT

The present invention relates to the field of three-dimensional images, and provides a method for three-dimensional reconstruction of a target object, comprising the following steps: S10: calculating and acquiring a visual angle boundary of the target object; S20: acquiring image information of the target object under multiple visual angles in the visual angle boundary, the image information including initial image information and/or fused image information; S30: finishing three-dimensional reconstruction of the target object according to the acquired image information. By adopting the method for three-dimensional reconstruction of the target object in the present invention, three-dimensional reconstruction of the three-dimensional target at different moments can be carried out in real time, no other links are carried out during the operation, the acquired image information is not lost, real information is directly reproduced, and three-dimensional reconstruction of the real target object is realized.

12 Claims, 4 Drawing Sheets

(58) Field of Classification Search
CPC . G06T 2207/20221; G06T 2207/10016; G06T 7/55; G06T 5/50; H04N 13/111
See application file for complete search history.

(56) References Cited

U.S. PATENT DOCUMENTS

| | | |
|---|---|---|
| 2018/0240280 A1* | 8/2018 | Chen ........................ G06T 19/20 |
| 2019/0156120 A1* | 5/2019 | Lorenzo .............. G06F 3/04815 |
| 2021/0304494 A1 | 9/2021 | Yamamoto et al. |
| 2021/0398352 A1 | 12/2021 | Tokumo |
| 2022/0245890 A1* | 8/2022 | Fialko ........................ G06T 7/80 |

* cited by examiner

METHOD AND SYSTEM FOR THREE-DIMENSIONAL RECONSTRUCTION OF TARGET OBJECT

CROSS REFERENCE TO RELATED APPLICATIONS

The present application claims the benefit of Chinese Patent Application No. 202210566798.0 filed on May 24, 2022, the contents of which are incorporated herein by reference in their entirety.

FIELD OF THE INVENTION

The present invention relates to the field of three-dimensional images, particularly to a method and a system for three-dimensional reconstruction of a target object.

BACKGROUND OF THE INVENTION

In the prior art, objects can be displayed in the form of two-dimensional pictures, and can also be displayed in a three-dimensional (stereoscopic) manner. The three-dimensional display method usually adopts a three-dimensional modeling method or the data obtained by three-dimensional scanning technology are displayed in the form of surface or point cloud.

But when the three-dimensional display of objects is carried out by modeling or three-dimensional scanning technology, the following problems may occur: (1) the loss of carrying information will occur during the three-dimensional display process, and the object's full, real information cannot be displayed completely, thus the displayed 3D object is not a real 3D display of the object; it is easy to create an illusion in the field of vision, thinking that the object is displayed in 3D mode and all information is displayed; (2) in the prior art, there is still the problem that it is impossible to display some objects through scanning/modeling. For example, when the objects are flames, smoke, water droplets, plasma, etc., these objects have high light, high reflection, and high transparency. The 3D recording of the above-mentioned objects cannot be realized through the current 3D scanning technology, because the method will lose details, physical properties, and the response information between the object itself and the environment from the perspective of technical principles, paths, and traditional 3D reconstruction technology systems.

SUMMARY OF THE INVENTION

An object of the present invention is to provide a method and system for three-dimensional reconstruction of a target object to solve the technical problems in the prior art, mainly including the following two aspects:

In one aspect, the present invention provides a method for three-dimensional reconstruction of a target object, comprising the following steps:
S10: calculating and acquiring a visual angle boundary of the target object;
S20: acquiring image information of the target object under multiple visual angles in the visual angle boundary, the image information including initial image information and/or fused image information;
S30: finishing three-dimensional reconstruction of the target object according to the acquired image information.

Further, the step S10 further comprises:
S11: calculating the maximum boundary radius of the target object under the visual angle;
S12: taking an edge formed by the maximum boundary radius as the visual angle boundary.

Further, the method further comprises the following steps after the step S20:
S41: calculating a preset area in the acquired image information;
S42: segmenting the area outside the preset area to obtain image information of the preset area.

Further, the step S20 of acquiring the fused image information comprises:
S21: acquiring an acquisition distance between an acquisition apparatus and the target object under a corresponding visual angle;
S22: segmenting the acquisition distance into a plurality of preset acquisition distances based on a preset number, and acquiring cut image information by the acquisition device based on the preset acquisition distances;
S23: fusing the plurality of pieces of cut image information under the same visual angle to form the fused image information.

Further, the step S30 further comprises:
calling the image information to complete three-dimensional reconstruction of the target object;
or the step S30 comprises:
S31: establishing an attribute number according to the acquired image information under the multiple visual angles, and storing the image information into a preset position of a storage unit according to the attribute number;
S32: setting a reconstruction serial number by the reconstruction unit;
S33: completing three-dimensional reconstruction of the target object according to the preset position and the reconstruction serial number.

In a second aspect, the present invention further provides a three-dimensional reconstruction system of a target object. The system comprises the following modules:
a boundary calculation module which is used for calculating and acquiring a visual angle boundary of the target object;
an image acquisition module which is used for acquiring image information of the target object under multiple visual angles in the visual angle boundary, the image information including initial image information and/or fused image information;
a reconstruction module which is used for finishing three-dimensional reconstruction of the target object according to the acquired image information.

Further, the boundary calculation module is further used for:
calculating a maximum boundary radius of the target object under the visual angle; and
taking an edge formed by the maximum boundary radius as the visual angle boundary.

Further, the system further comprises a preset module, wherein the preset module is further used for
calculating a preset area in the acquired image information;
segmenting an area outside the preset area to obtain image information of the preset area.

Further, the image acquisition module is further used for:
acquiring an acquisition distance between an acquisition apparatus and the target object under a corresponding visual angle;

segmenting the acquisition distance into a plurality of preset acquisition distances based on a preset number, and acquiring cut image information by the acquisition device based on the preset acquisition distances;

fusing the plurality of pieces of cut image information under the same visual angle to form the fused image information.

Further, the reconstruction module is further used for:

calling the image information to complete three-dimensional reconstruction of the target object;

or:

establishing an attribute number according to the acquired image information under the multiple visual angles, and storing the image information into a preset position of a storage unit according to the attribute number;

setting a reconstruction serial number by the reconstruction unit;

completing three-dimensional reconstruction of the target object according to the preset position and the reconstruction serial number.

Compared with the prior art, the present invention at least has the following technical effects:

(1) in the present invention, before the image information of the target object is acquired, firstly, the maximum boundary radius of the display image of the target object under the corresponding visual angle is calculated, the edge formed by the maximum boundary radius is taken as the visual angle boundary, the display image of the target object under the corresponding visual angle is contained in the visual angle boundary, so that noise information, outside the visual angle boundary, of the target object under the corresponding visual angle is removed in the collection of the image information of the target object, only required information is acquired, and as a result, the influence of other information on subsequent three-dimensional reconstruction is avoided, and the information amount of the image is reduced;

(2) in the present invention, the acquisition distance between the acquisition apparatus and the target object under the same visual angle is acquired, the acquisition distance is segmented according to the preset number, the corresponding segmented image information is acquired, and multiple segmented images are fused. Therefore, the image information acquired by adopting the method under the same visual angle is clearer, and carried noise information is less, and thus the target object is smoother and faster during three-dimensional reconstruction;

(3) in the present invention, the preset area in the acquired image information is calculated, and then the area outside the preset area is segmented to obtain corresponding preset area image information under different visual angles, thus the information outside the target object in the acquired image information is segmented, the noise information amount carried by the image information is greatly reduced, the three-dimensional reconstruction information amount is greatly reduced, and the three-dimensional reconstruction efficiency is improved; and (4) by adopting the method for three-dimensional reconstruction of the target object in the present invention, three-dimensional reconstruction of the three-dimensional target at different moments can be carried out in real time, no other links are carried out during the operation, the acquired image information is not lost, real information is directly reproduced, and three-dimensional reconstruction of the real target object is realized.

BRIEF DESCRIPTION OF THE DRAWINGS

In order to illustrate the embodiments of the present disclosure or the technical solutions in the prior art more clearly, the accompanying drawings used in the embodiments or the description of the prior art will be briefly described below. Obviously, the accompanying drawings in the following description are only a part of embodiments of the present invention, and for persons of ordinary skill in the art, other drawings can be obtained based on these accompanying drawings without creative efforts.

DETAILED DESCRIPTION

The following description provides a plurality of different embodiments, or examples, for implementing the various features of the present invention. The elements and arrangements described in the following specific examples are merely used to describe the present invention concisely and are only used as examples rather than limiting the present invention.

Various aspects of the present invention are described more sufficiently herein with reference to the accompanying drawings. The present invention may, however, be embodied in many different forms and should not be construed as limited to any specific structure or function presented throughout the invention. Rather, these aspects are provided so that this disclosure will be thorough and complete, and will fully convey the scope of the invention to those skilled in the art. Based on the teachings herein those skilled in the art will appreciate that the scope of the present invention is intended to encompass any aspect disclosed herein, whether implemented alone or in combination with any other aspect of the present invention. For example, it may be implemented using any number of devices or implementations presented herein. Furthermore, in addition to the aspects of the present invention presented herein, the scope of the present invention is intended to encompass an apparatus or method implemented using other structures, functions, or both. It should be understood that any aspect disclosed herein may be embodied by one or more elements of a claim.

The terms used herein are for the purpose of describing particular embodiments only and are not intended to limit the present disclosure. The terms "comprise/comprising", "include/including", etc. used herein indicate the presence of the said features, steps, operations and/or components, but do not exclude the presence or addition of one or more other features, steps, operations or components.

All terms (including technical and scientific terms) used herein have the same meaning as commonly understood by those skilled in the art, unless otherwise defined. It should be noted that the terms used herein should be interpreted to have a meaning consistent with the context of this specification, and should not be interpreted in an idealized or overly rigid manner.

An object of the present invention is to provide a method and a system for three-dimensional reconstruction of a target object to solve the technical problems in the prior art, mainly including the following two examples:

Example 1

Figure 1:
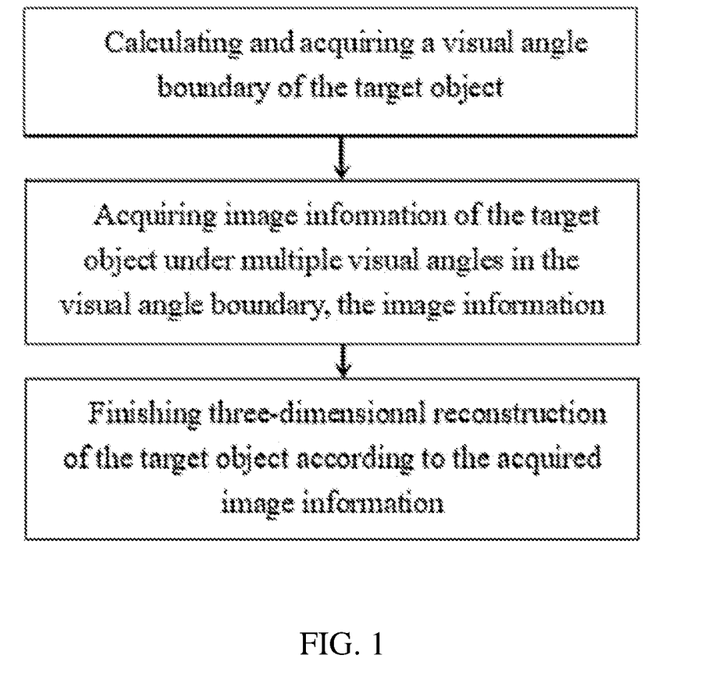
FIG. 1 is a flow chart of a method for three-dimensional reconstruction of a target object of the present invention.

As shown in FIGS. 1 to 5, the example 1 of the present invention provides a method for three-dimensional reconstruction of a target object, comprising the following steps:

S10: calculating and acquiring a visual angle boundary of the target object;

S20: acquiring image information of the target object under multiple visual angles in the visual angle boundary, the image information including initial image information and/or fused image information;

S30: finishing three-dimensional reconstruction of the target object according to the acquired image information.

In the prior art, although a three-dimensional modeling or three-dimensional scanning method can be used for realizing three-dimensional reconstruction of an object in a "surface sense", which gives people an illusion of vision and consciousness that the 3D display of the object can be realized at present, but actually, in the process of performing three-dimensional display of the object by three-dimensional modeling or three-dimensional scanning, the real information carried by the object will be lost, and then three-dimensional display of the object in the real world cannot be performed through the display of the three-dimensional object. In view of this, the present invention provides three-dimensional display of the target object in a "real sense", which can completely realize three-dimensional display of the target object in the real world. The implementation mode in the present invention is as follows.

S10: calculating and acquiring a visual angle boundary of the target object;

Further, the step S10 further comprises:

S11: calculating the maximum boundary radius of the target object under the visual angle;

S12: taking an edge formed by the maximum boundary radius as the visual angle boundary.

Figure 2:
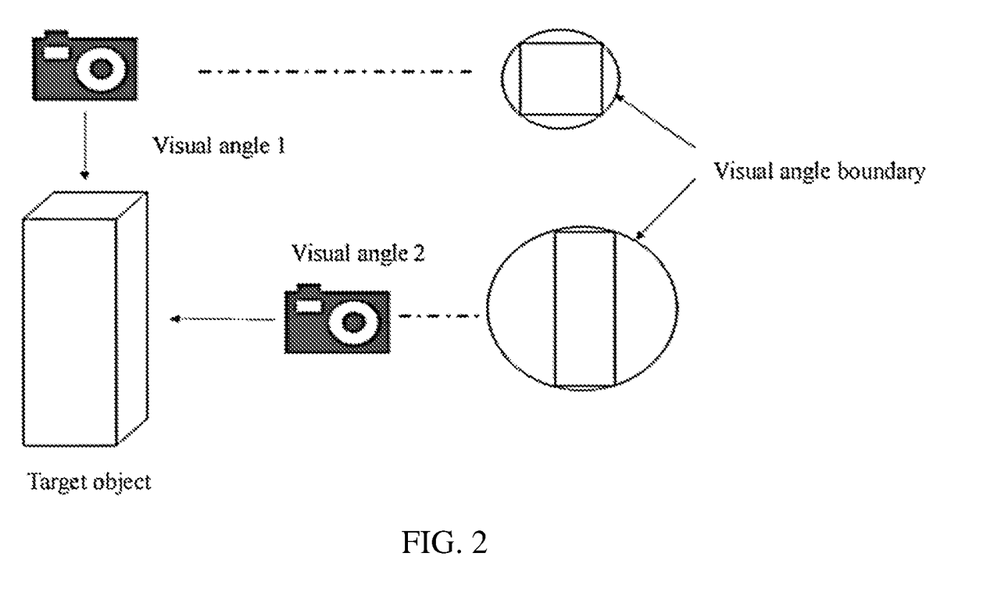
FIG. 2 is a schematic diagram of a visual angle boundary of a target object of the present invention.

Before the target object is acquired by an acquisition apparatus, in order to reduce the influence of redundant interference information during target object acquisition, it is needed to calculate the visual angle boundaries of the target object needing to be acquired under different visual angles.

For example, the visual angles for target object acquisition include a visual angle 1, a visual angle 2, a visual angle 3, a visual angle 4 and a visual angle N. In case of acquiring image information of the target object under the visual angle 1, firstly an image of the target object displayed under the visual angle 1 is acquired, then a central position of the target object in the image of the target object displayed under the visual angle 1 is calculated, then a corresponding maximum boundary radius is calculated by taking the central position as a circle center, and an edge of a circle (or a round or an ellipse) formed by the maximum boundary radius is taken as a visual angle boundary, and thus the target object can be completely contained in the formed corresponding visual angle boundary. In order to better understand, it is assumed that the image of the target object displayed under the visual angle 1 is a rectangle, then the central position of the rectangle is calculated, the central position is taken as the circle center, the maximum boundary radius (circumscribed radius) based on the circle center is calculated, namely, the circumscribed circle of the rectangle, and the edge of the circumscribed circle is taken as the visual angle boundary, and thus the rectangle is completely contained in the circumscribed circle; the image of the target object displayed under the visual angle 2 is a triangle, then the central position of the triangle is calculated, the central position is taken as the circle center, the maximum boundary radius (circumscribed radius) based on the circle center is calculated, namely, the circumscribed circle of the triangle, and the edge of the circumscribed circle is taken as the visual angle boundary, and thus the triangle is completely contained in the circumscribed circle.

Further, the maximum boundary radiuses of the target object under each visual angle are compared, the longest maximum boundary radius is selected as a target maximum boundary radius, a formed spherical visual angle boundary completely wraps the target object, and accordingly, the image information of the target object under each visual angle is acquired; certainly, an ellipse (or ellipsoid) edge formed by combining the maximum boundary radiuses under any two or more visual angles can be taken as the visual angle boundary, and the image information of the target object under each visual angle is acquired in this visual angle boundary; and the shapes of the images of the target object displayed under different visual angles can be completely same, partially same and completely different.

It should be noted that the acquisition apparatus in the present invention can be a photographing apparatus, a camera, a virtual camera and the like, can be used for acquiring the image of the target, and no specific limitation is made herein.

In the present invention, before the image information of the target object is acquired, firstly, the maximum boundary radius of the display image of the target object under the corresponding visual angle is calculated, the edge formed by the maximum boundary radius is taken as the visual angle boundary, the display image of the target object under the corresponding visual angle is contained in the visual angle boundary, so that noise information, outside the visual angle boundary, of the target object under the corresponding visual angle is removed in the collection of the image information of the target object, only required information is acquired, and as a result, the influence of other information on subsequent three-dimensional reconstruction is avoided, and the information amount of the image is reduced;

S20: acquiring image information of the target object under multiple visual angles in the visual angle boundary, the image information including initial image information and/or fused image information;

Further, the step S20 of acquiring the fused image information comprises:

S21: acquiring an acquisition distance between an acquisition apparatus and the target object under a corresponding visual angle;

S22: segmenting the acquisition distance into a plurality of preset acquisition distances based on a preset number, and acquiring cut image information by the acquisition device based on the preset acquisition distances;

S23: fusing the plurality of pieces of cut image information under the same visual angle to form the fused image information.

Figure 3:
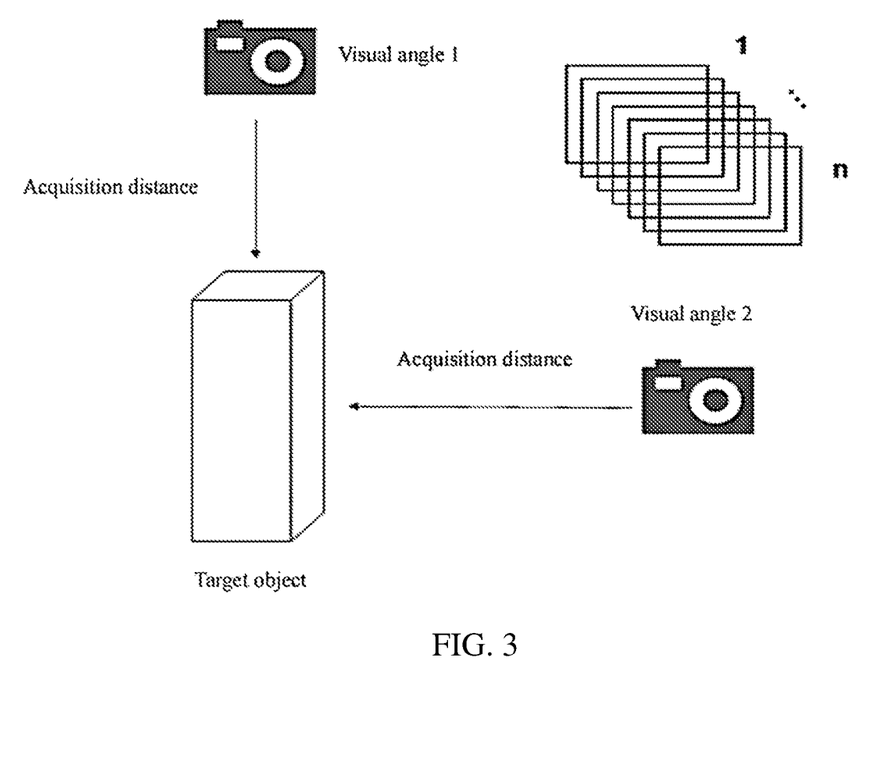
FIG. 3 is a schematic diagram of acquiring fused image information of the present invention.

After the boundary of the boundary visual angle in the image of the target object displayed under different visual angles is calculated, the image information of the target object in the boundary of the visual angle under the corresponding visual angle is collected by the acquisition apparatus. When acquiring the image information, the following two modes can be adopted:

one mode is that the initial image information of the target object under different visual angles is directly acquired, wherein the initial image includes the original information carried by the target object at the moment of shooting, the image information is the information of the target object at the moment, which is acquired by the acquisition apparatus, and the image is not processed.

Another mode is that image information acquired under each visual angle is to be subjected to fusion processing. The specific method comprises the following steps: firstly, acquiring a distance to be acquired between the target object and an acquisition apparatus under each visual angle, then setting a preset number which refers to the number of the acquisition distances to be segmented, and acquiring corresponding image information (segmented image information) at each segmentation point under the corresponding visual angle; and finally, after the segmented image information at each segmentation point under the same visual angle is acquired, fusing all the cut image information according to a fusion rule so as to obtain fused image information under the same visual angle. For example, in case of a visual angle 1, a visual angle 2, a visual angle 3, a visual angle 4 and a visual angle N, the method comprises: firstly, acquiring the acquisition distance between the acquisition apparatus and the target object under the visual angle 1, then setting the preset number needing to be segmented, if the preset number is 3, acquiring the segmented image information at each segmentation distance or segmentation point, namely acquiring the segmentation image information 1 at the segmentation distance 1, the segmentation image information 2 at the segmentation distance 2 and the segmentation image information 3 at the segmentation distance 3, and performing fusing on the segmentation image information 1, the segmentation image information 2 and the segmentation image information 3 according to other rules such as the segmentation distance or the depth of the acquisition apparatus so as to form the fused image information of the target object under the visual angle 1.

It should be noted that the acquisition distances between the target object and the acquisition apparatus under different visual angles can be completely same, partially same or completely different; the preset number of the acquisition distances between the target object and the acquisition apparatus under different visual angles to be segmented can be completely same, partially same or completely different; the segmentation mode of the acquisition distances between the target object and the acquisition apparatus under different visual angles is not limited, uniform segmentation can be performed, dense segmentation can be performed on the position, with much image information, of the target object, and sparse segmentation can be performed on the position, with little image information, of the target object.

It should be noted that when acquiring the image information of the target object in the visual angle boundary, a regular acquisition mode can be adopted, and an irregular acquisition mode can also be adopted; when acquiring the image information of the target object in the visual angle boundary, the image information of the target object under different visual angles at the same moment can be acquired, and the image information of the target object under different visual angles within a period of time can also be acquired.

It should be noted that when the target object is under different visual angles, different image information can be acquired, and the same image information can also be acquired; for example, when the target object is under the visual angle 1, initial image information of the target object is acquired; when the target object is under the visual angle 2, fused image information of the target object is acquired; when the target object is under the visual angle 1, the initial image information and the fused image information can be acquired at the same time, and no limitation is made here.

It should be noted that when the target object is under different visual angles, the obtained image information can be complete image information or complete image information formed by splicing multiple pieces of sub-image information.

In the present invention, the acquisition distance between the acquisition apparatus and the target object under the same visual angle is acquired, the acquisition distance is segmented according to the preset number, the corresponding segmented image information is acquired, and multiple segmented images are fused. Therefore, the image information acquired by adopting the method under the same visual angle is clearer, and carried noise information is less, and thus the target object is smoother and faster during three-dimensional reconstruction.

Further, the method further comprises the following steps after the step S20:

S41: calculating a preset area in the acquired image information;

S42: segmenting the area outside the preset area to obtain image information of the preset area.

In the above technical solutions, when the initial image information or the fused image information of the target object in the visual angle boundary under multiple visual angles is acquired, and if the initial image information is acquired, a preset area in the initial image information is calculated firstly, the preset area is an area where the target object is located, then a segmentation method is adopted to segment an area which does not contain the target object, and preset area image information which only contains the area where the target object is located is acquired; and if the fused image information is acquired, a preset area in each piece of segmented image information under the same visual angle is calculated, and then the segmentation method is adopted to segment the area which does not contain the target object in the segmented image information, so that each piece of segmented image information only contains the preset area image information of the area where the target object is located.

In the present invention, the preset area in the acquired image information is calculated, and then the area outside the preset area is segmented to obtain corresponding preset area image information under different visual angles, thus the information outside the target object in the acquired image information is segmented, the noise information amount carried by the image information is greatly reduced, the three-dimensional reconstruction information amount is greatly reduced, and the three-dimensional reconstruction efficiency is improved.

Step S30: finishing three-dimensional reconstruction of the target object according to the acquired image information.

Further, the step S30 further comprises:

calling the image information to complete three-dimensional reconstruction of the target object;

or the step S30 comprises:

S31: establishing an attribute number according to the acquired image information under the multiple visual angles, and storing the image information into a preset position of a storage unit according to the attribute number;

S32: setting a reconstruction serial number by the reconstruction unit;

S33: completing three-dimensional reconstruction of the target object according to the preset position and the reconstruction serial number.

Figure 4:
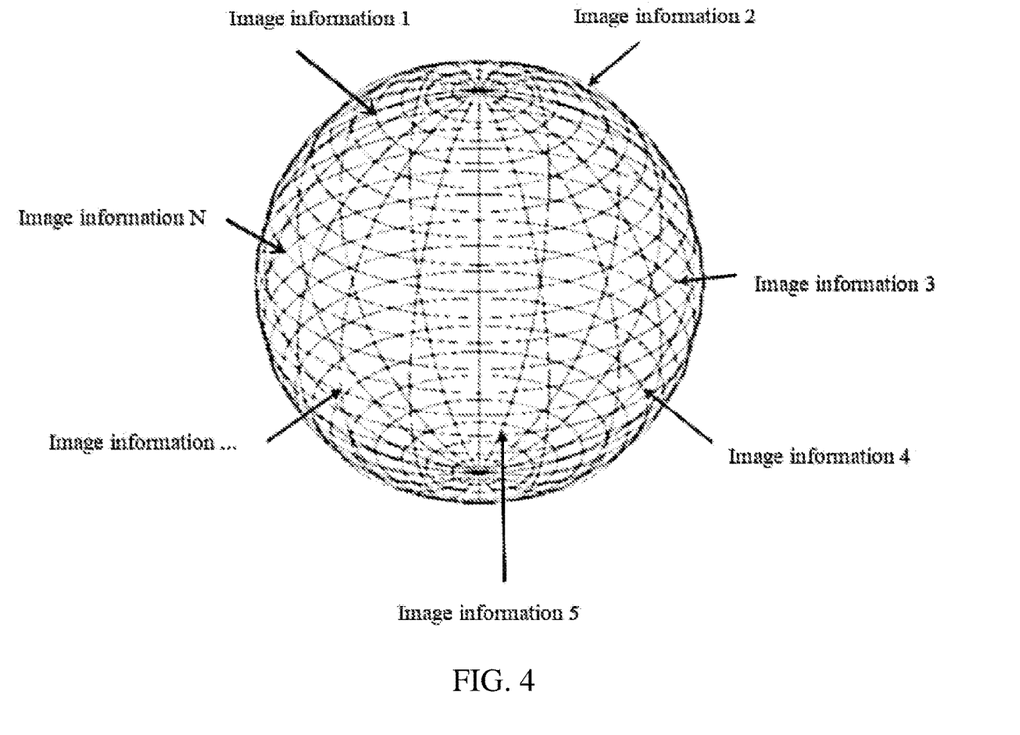
FIG. 4 is a first schematic diagram of three-dimensional reconstruction in the present invention.
Figure 5:
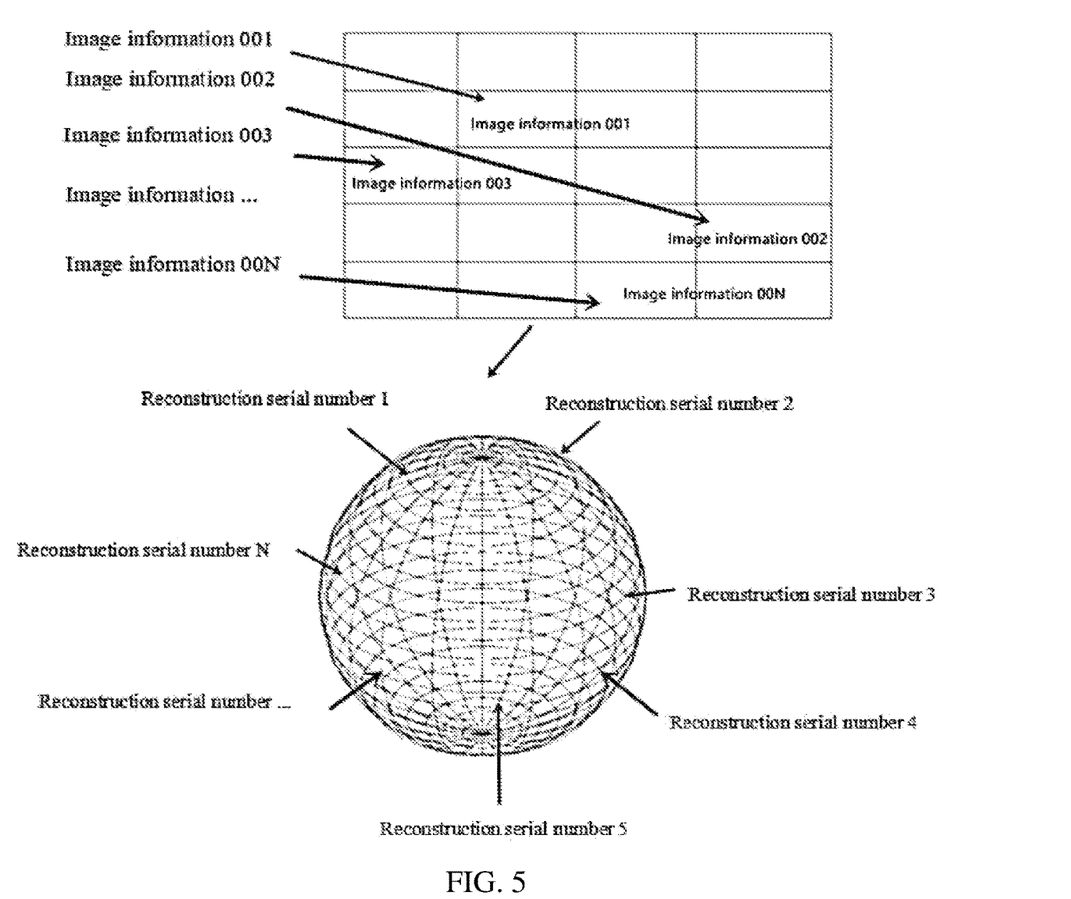
FIG. 5 is a second schematic diagram of three-dimensional reconstruction in the present invention.

According to the above technical solutions, after image information of the target object is acquired under different visual angles, three-dimensional reconstruction of the target object can be completed according to the acquired image in the present invention. Two three-dimensional reconstruction modes are provided:

one mode is that after the image information of the target object is acquired, three-dimensional reconstruction can be directly performed through a display terminal according to the acquired image, it can be understood as that three-dimensional reconstruction is performed while the image information of the target object is acquired, three-dimensional reconstruction of the three-dimensional target at different moments can be performed in real time, other links are not performed in the process, the acquired image information is not lost, real information is directly reconstructed, and thus real three-dimensional reconstruction of the target object is realized.

Another mode is that firstly, after the image information of the target object is acquired, an attribute number is established according to the acquired image information under different visual angles, wherein the attribute number can be established according to visual angle information, azimuth information (such as longitude and latitude), moment information and the like in the image information, for example, the image information under the visual angle 1 is numbered as 1-45°-3, 001, abc, 1_1_0, 1-1-0 and the like, and the establishment rule of the attribute number is not limited and only can represent the image information under the current visual angle at the current moment; then, the image information with different attribute numbers is stored into a preset position of a storage apparatus, wherein a mapping relation is formed between the attribute numbers and the preset position, thus the storage is convenient, and subsequent calling is facilitated; and finally, serial numbers for reconstruction of the target object under different visual angles when three-dimensional reconstruction is realized are set, and the image information stored in the preset position is called to the reconstruction position with the corresponding reconstruction serial number, wherein a mapping relation is formed between the preset position and the reconstruction serial number, thus rapid calling is facilitated, and three-dimensional reconstruction of the target object is completed.

It should be noted that the storage apparatus can be the acquisition apparatus, can also be a rear-end server connected with the acquisition apparatus and the like, and no limitation is made herein.

Example 2

The three-dimensional reconstruction system for the target object provided by the embodiments of the present invention can realize each implementation mode in the embodiments of the method for three-dimensional reconstruction of the target object and corresponding beneficial effects, and to avoid repetition, no more description is made herein.

The example 2 of the present invention provides a three-dimensional reconstruction system of a target object, comprising the following modules:

a boundary calculation module which is used for calculating and acquiring a visual angle boundary of the target object;

an image acquisition module which is used for acquiring image information of the target object under multiple visual angles in the visual angle boundary, the image information including initial image information and/or fused image information;

a reconstruction module which is used for finishing three-dimensional reconstruction of the target object according to the acquired image information.

Further, the boundary calculation module is further used for:

calculating a maximum boundary radius of the target object under the visual angle;

taking an edge formed by the maximum boundary radius as the visual angle boundary.

Further, the system further comprises a preset module, wherein the preset module is further used for:

Calculating a preset area in the acquired image information;

segmenting an area outside the preset area to obtain image information of the preset area.

Further, the image acquisition module is further used for:

acquiring an acquisition distance between an acquisition apparatus and the target object under a corresponding visual angle;

segmenting the acquisition distance into a plurality of preset acquisition distances based on a preset number, and acquiring cut image information by the acquisition device based on the preset acquisition distances;

fusing the plurality of pieces of cut image information under the same visual angle to form the fused image information.

Further, the reconstruction module is further used for:

calling the image information to complete three-dimensional reconstruction of the target object;

or:

establishing an attribute number according to the acquired image information under the multiple visual angles, and storing the image information into a preset position of a storage unit according to the attribute number;

setting a reconstruction serial number by the reconstruction unit;

completing three-dimensional reconstruction of the target object according to the preset position and the reconstruction serial number.

In order to better understand the present invention, a teapot is taken as an example for illustration:

when a light source irradiates the surface of the teapot, the states of highlight at the same position on the surface of the teapot under different visual angles are different (namely the teapot is fixed, and the same position is viewed under different visual angles); for example, under the first visual angle 1 (when viewing the highlight in front), the highlight is obviously displayed on the surface of the teapot, and if the teapot is made of a ceramic material, information such as lines, porcelain glaze and bubbles on the surface of the teapot under the highlight is clearly displayed; under the second visual angle 2 (when viewing the highlight obliquely), the highlight is partially displayed on the surface of the teapot, the gloss is weakened, and information such as lines, porcelain glaze and bubbles on the surface of the teapot under the highlight cannot be clearly displayed; at the same position on the teapot, the display states are different under different visual angles (namely the teapot rotates, and the same position rotates under different visual angles); for example, when the position is in a highlight area, information such as lines and bubbles on the surface of the teapot can be clearly seen on the surface, and when the position is rotated to be far away from the highlight position, different states can be presented.

By adopting the method for three-dimensional reconstruction of the present invention, the acquired image information is directly subjected to three-dimensional reconstruction, thus different display states and different image information of the teapot in a three-dimensional state under different visual angles can be truly displayed; and the object in reality has different attributes and states at different moments, under different visual angles and in different environments, so different feedbacks are presented at the same position on the object under different visual angles, different environments and different states. In the prior art, the three-dimensional display of the teapot through modeling and three-dimensional scanning cannot truly display the information such as highlight on the surface of the teapot; in addition, 1) the biggest difference between the present invention and the prior art is also the characteristics of the present invention, the method for three-dimensional reconstruction of the target object provided by the present invention can realize the three-dimensional reconstruction of objects with highlight, high reflection and high transmittance, such as flames, smoke, water drops and plasmas with uncertain forms, reaction information between the objects and the environment can be truly reflected, and the technical problem that three-dimensional display of these objects cannot be realized in the prior art is solved; and 2) when the image information of the target object under preset data and different visual angles is acquired by adopting the method of the present invention, the target is subjected to three-dimensional reconstruction, and moreover, more information parameters of the target object can be acquired, thus data of a sample can be extracted, analyzed and summarized to obtain other rules, attributes and other information of the target object, and as a result, the target object can be subjected to secondary data application such as identification, classification and tracking and deep development and mining.

Technicians skilled in the art can be further aware that the units and algorithm steps of each example described in conjunction with the embodiments disclosed herein can be realized by electronic hardware, computer software or a combination of the two; in order to clearly illustrate the interchangeability of the hardware and the software, in the above description, the components and steps of each example have been generally described according to their functions. Whether these functions are executed by hardware or software depends on the specific application and design constraints of the technical solution. Those skilled in the art may use different methods to implement the described functions for each specific application, but such implementation should not be regarded as exceeding the scope of the present invention.

The above description of the disclosed embodiments is provided to enable any person skilled in the art to realize or use the present invention. Various modifications to these embodiments will be readily apparent to those skilled in the art, and the general principles defined herein may be implemented in other embodiments without departing from the spirit or scope of the present invention. Therefore, the present invention will not be limited to the embodiments shown herein, but is to be accorded the widest scope consistent with the principles and novel features disclosed herein.

The foregoing description merely describes the preferred embodiments of the present invention, and is not intended to limit the present invention. Any modification, equivalent replacement and improvement etc. made within the spirit and principles of the present invention shall fall within the scope of protection of the present invention.

What is claimed is:

1. A method for three-dimensional reconstruction of a target object, comprising the following steps:
    calculating and acquiring a visual angle boundary of the target object;
    acquiring image information of the target object under multiple visual angles in the visual angle boundary, the image information including initial image information and/or fused image information;
    finishing three-dimensional reconstruction of the target object according to the acquired image information;
    the calculating and acquiring comprising:
    acquiring an image of the target object displayed under each of the multiple visual angles;
    for each visual angle:
        calculating a central position of the target object in the image of the target object displayed under the visual angle; and
        calculating a maximum boundary radius by taking the central position as a circle center such that the target object under the visual angle is completely contained in a circle formed by the maximum boundary radius; and
    acquiring the visual angle boundary of the target object based on comparison or combination of multiple maximum boundary radii.

2. The method for three-dimensional reconstruction of a target object according to claim 1, wherein the method further comprises the following steps after the finishing:
    calculating a preset area in the acquired image information;
    segmenting the area outside the preset area to obtain image information of the preset area.

3. The method for three-dimensional reconstruction of a target object according to claim 1, wherein the acquiring of the fused image information comprises:
    acquiring an acquisition distance between an acquisition apparatus and the target object under a corresponding visual angle;
    segmenting the acquisition distance into a plurality of preset acquisition distances based on a preset number, and acquiring cut image information by the acquisition device based on the preset acquisition distances;
    fusing the plurality of pieces of cut image information under the same visual angle to form the fused image information.

4. The method for three-dimensional reconstruction of a target object according to claim 1, wherein the finishing further comprises:
    calling the image information to complete three-dimensional reconstruction of the target object;
    or the finishing comprises:
    establishing an attribute number according to the acquired image information under the multiple visual angles, and storing the image information into a preset position of a storage unit according to the attribute number;

setting a reconstruction serial number by the reconstruction unit;

completing three-dimensional reconstruction of the target object according to the preset position and the reconstruction serial number.

5. The method for three-dimensional reconstruction of a target object according to claim 1, wherein the acquiring of the visual angle boundary of the target object based on comparison or combination of multiple maximum boundary radii comprises:

comparing maximum boundary radii of the target object under each visual angle, and selecting a longest maximum boundary radius as the visual angle boundary of the target object.

6. The method for three-dimensional reconstruction of a target object according to claim 1, wherein the acquiring of the visual angle boundary of the target object based on comparison or combination of multiple maximum boundary radii comprises:

taking an ellipse or ellipsoid formed by combining maximum boundary radii under any two or more visual angles as the visual angle boundary of the target object.

7. A three-dimensional reconstruction system of a target object, comprising the following modules:

a boundary calculation module which is used for calculating and acquiring a visual angle boundary of the target object;

an image acquisition module which is used for acquiring image information of the target object under multiple visual angles in the visual angle boundary, the image information including initial image information and/or fused image information;

a reconstruction module which is used for finishing three-dimensional reconstruction of the target object according to the acquired image information;

the boundary calculation module calculates and acquires the visual angle boundary of the target object by:

acquiring an image of the target object displayed under each of the multiple visual angles;

for each visual angle:
  calculating a central position of the target object in the image of the target object displayed under the visual angle; and
  calculating a maximum boundary radius by taking the central position as a circle center such that the target object under the visual angle is completely contained in a circle formed by the maximum boundary radius; and acquiring the visual angle boundary of the target object based on comparison or combination of multiple maximum boundary radii.

8. The three-dimensional reconstruction system of a target object according to claim 7, wherein the system further comprises a preset module, and the preset module is used for:

calculating a preset area in the acquired image information;

segmenting an area outside the preset area to obtain image information of the preset area.

9. The three-dimensional reconstruction system of a target object according to claim 7, wherein the image acquisition module is further used for:

acquiring an acquisition distance between an acquisition apparatus and the target object under a corresponding visual angle;

segmenting the acquisition distance into a plurality of preset acquisition distances based on a preset number, and acquiring cut image information by the acquisition device based on the preset acquisition distances;

fusing the plurality of pieces of cut image information under the same visual angle to form the fused image information.

10. The three-dimensional reconstruction system of a target object according to claim 7, wherein the reconstruction module is further used for:

calling the image information to complete three-dimensional reconstruction of the target object;

or:

establishing an attribute number according to the acquired image information under the multiple visual angles, and storing the image information into a preset position of a storage unit according to the attribute number;

setting a reconstruction serial number by the reconstruction unit;

completing three-dimensional reconstruction of the target object according to the preset position and the reconstruction serial number.

11. The three-dimensional reconstruction system of a target object according to claim 7, wherein the acquiring of the visual angle boundary of the target object based on comparison or combination of multiple maximum boundary radii comprises:

comparing maximum boundary radii of the target object under each visual angle, and selecting a longest maximum boundary radius as the visual angle boundary of the target object.

12. The three-dimensional reconstruction system of a target object according to claim 7, wherein the acquiring of the visual angle boundary of the target object based on comparison or combination of multiple maximum boundary radii comprises:

taking an ellipse or ellipsoid formed by combining maximum boundary radii under any two or more visual angles as the visual angle boundary of the target object.

* * * * *